Nov. 28, 1933.  B. E. LENEHAN  1,936,797

PHASE SEQUENCE NETWORK

Filed May 25, 1932

WITNESSES:
R. S. Williams
Geo. O. Harrison

INVENTOR
Bernard E. Lenehan.
BY
ATTORNEY

Patented Nov. 28, 1933

1,936,797

UNITED STATES PATENT OFFICE 1,936,797

PHASE-SEQUENCE NETWORK

Bernard E. Lenehan, Bloomfield, N. J., assignor to Westinghouse Electric & Manufacturing Company, East Pittsburgh, Pa., a corporation of Pennsylvania Application May 25, 1932. Serial No. 613,583

9 Claims. (Cl. 172—245)

My invention relates to phase-sequence apparatus and particularly to apparatus for segregating the positive and negative phase-sequence components of polyphase vector quantities in systems in which zero phase-sequence components do not exist, such as three-phase three-wire systems.

It is well known that any polyphase system of vectors may be analyzed into three symmetrical groups of component vectors of the same frequency or angular velocity, termed positive phase-sequence components, negative phase-sequence components and zero phase-sequence components.

The zero phase-sequence components are a measure of the vector sum of a system of vectors, and disappear when the sum of the vectors becomes zero. The negative phase-sequence components are a measure of the degree of unbalance of a system of vectors and disappear when the system becomes symmetrical or balanced. The positive phase-sequence components are a measure of the degree of balance of a system of vectors and become identical with the vectors themselves when the vector system becomes symmetrical.

Because of these properties of symmetrical components, it is possible, by segregating and measuring them, as they occur in the vector systems of polyphase alternating-current apparatus, to obtain alternating-current or voltage values which can be advantageously employed for protective, metering or general control purposes. This principle has been extensively used in the prior art.

In three-phase three-wire systems, the current vectors and voltage vectors must, from Kirchoff's laws, add vectorially to zero. It will, therefore, be seen that only positive and negative phase-sequence components can exist. It will also be apparent from Kirchoff's laws, that any system of three vectors occurring in such systems is completely determined by any two of the vectors, so that in order to completely measure the current phase-sequence components or the voltage phase-sequence components, it is necessary to measure only two current values or two voltage values, respectively, of the system.

In the U. S. Patent No. 1,535,587, to R. D. Evans, issued April 28, 1925 and assigned to the Westinghouse Electric & Manufacturing Company, there is disclosed phase-sequence apparatus for segregating phase-sequence components of currents in three-phase three-wire systems, in which a pair of current transformers are provided for measuring the current values in two conductors. The secondary windings of these transformers are connected in a circuit which includes reactance and resistance elements, and the translating device, such as a relay or meter, which is to respond to the phase-sequence components. While the system disclosed in this patent is reliable and satisfactory, it is subject to the disadvantage that in order to obtain the proper phase relation of voltages in the secondaries of the current transformers, a somewhat unusual connection of the current transformers, which results in a phase displacement of 60° in their secondary currents, is necessary. Because of the conductive connection of the secondary windings, it is usually not practicable to operate other translating devices from these two current transformers, nor is it possible to connect them in standard V or Y connection.

It is accordingly an object of my invention to provide novel apparatus for segregating positive or negative phase-sequence current components in which a pair of current transformers having electrically separate secondary circuits shall be provided.

A further object of my invention is to provide novel apparatus for segregating positive or negative phase-sequence current components, in which a pair of current transformers, which may be connected in standard Y or V connection, shall be provided.

A further object of my invention is to provide novel apparatus for segregating positive or negative phase-sequence voltage components.

Other objects of my invention will become apparent from the following description taken in conjunction with the accompanying drawing, in which Figure 1 is a diagrammatic view of a network for segregating positive or negative phase-sequence current components, embodying my invention.

Figure 1:
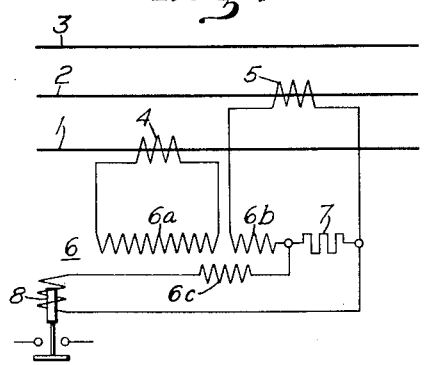

Referring to Fig. 1 of the drawing, a pair of current transformers 4 and 5, of any suitable type, are connected to be energized in accordance with the current on the conductors 1 and 2, respectively, of a set of conductors 1, 2, 3 constituting part of a three-phase three-wire system.

The secondary winding of the current transformer 4 is connected with a winding 6a of a mutual inductance device 6. The secondary winding of the current transformer 5 is connected in a circuit which includes a winding 6b of the mutual inductance device 6 and a resistor 7. A third winding 6c of the mutual inductance device 6 is connected to the terminals of the resistor 7 in a circuit which includes any suitable translating device 8, which I have illustrated as a relay.

The current transformers 4 and 5 preferably have the same transformation ratios, and the mutual inductance device 6 is preferably, but not necessarily, an air-core device, so designed that the mutual inductance of its windings 6a and 6c is approximately double the mutual inductance of its windings 6b and 6c.

The resistor 7 is of such resistance value that the sum of the IR drop in resistor 7 and the voltage component induced in the winding 6c by the winding 6b, leads the current in the secondary of the current transformer 5 by a phase angle 60° less than the phase angle by which the voltage component induced in the winding 6c by the winding 6a leads the current in the secondary winding of transformer 4. This relationship will be hereinafter more fully explained. The translating device 8 is of a current or voltage-responsive type.

Figure 2:
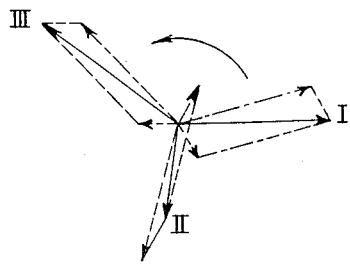
Figs. 2 and 3 are vector diagrams illustrating the principle of my invention.

The operation of the apparatus shown in Fig. 1 may be set forth as follows: Referring to Fig. 2, an unsymmetrical system of vectors, which adds vectorially to zero, is shown at I, II, III, corresponding to unbalanced current values in the conductors 1, 2 and 3, respectively, of Fig. 1. The two symmetrical systems of components which together constitute the vectors I, II, III are shown in broken lines and in light lines, respectively.

Assuming counter-clockwise rotation of all the vectors, as indicated by the arrow, the phase-sequence of the principal vectors I, II, III is I, II, III. The phase-sequence of the positive components (broken lines) is also I, II, III, but the phase-sequence of the negative components (light lines) is I, III, II, opposite or negative to that of the principal vectors.

As the negative phase-sequence components (light lines) represent the differences between the principal vectors (heavy lines) and the positive phase-sequence components (broken lines), it will be apparent that, if the negative components are made smaller, the positive components more and more nearly become equal to and coincident with the positive phase-sequence components. When the negative components disappear, the principal vectors must exactly coincide with the positive phase-sequence components. However, as the system of positive phase-sequence vectors is symmetrical, it may be seen that the negative components can be zero only when the system of principal vectors is symmetrical. The magnitude of the negative phase-sequence components is, therefore, a measure of the degree of unbalance of the principal vector system I, II, III.

The mutual inductance device 6 (Fig. 1) may be considered as a transformer having two primary windings and one secondary winding. Each of the primary windings 6a and 6b induces a voltage in the secondary winding 6c which leads the current producing it by a phase angle of 90°. The voltage available to produce current in the circuit comprising the secondary winding 6c and the coil of the relay 8 consists of the induced voltages mentioned above and the drop in voltage along the resistor 7. The currents flowing in the various circuits are determined by the conditions in the power circuit, and consequently the voltages induced in the secondary winding 6c and the voltage drop in resistor 7 depend only on the power circuit currents. The current in the coil of relay 8 is determined by the sum of these voltages and the impedance of the secondary circuit comprising winding 6c, the coil of relay 8 and resistor 7. As the latter impedance is a constant, the current in the coil of relay 8 is proportional to the sum of the voltages induced in the secondary winding 6c and the voltage drop in the resistor 7. This relationship may better be understood by reference to Fig. 3.

Figure 3:
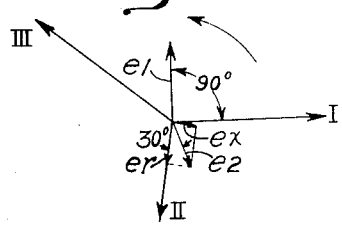

Referring to Fig. 3, the principal vectors I, II, III, representing unbalanced currents in the conductors 1, 2 and 3, are shown together with voltage vectors representing the voltage conditions in the remaining elements of Fig. 1.

The current in the winding 6a induces a voltage component in the winding 6c, which is proportional to the current vector I and leads the latter vector by substantially 90°. This voltage component is indicated in Fig. 3 by the reference character $e_1$.

The current in the winding 6b induces a voltage component in the winding 6c, bearing half the ratio to the vector II that the vector $e_1$ bears to the vector I, and which leads the vector II by 90°. This voltage component is denoted in Fig. 3 by the reference character $ex$.

It was explained above, in connection with Fig. 1, that the resistor 7 is of such resistance value that the phase angle between the current corresponding to the vector II and the vector sum of the IR drop in resistor 7 and the voltage component corresponding to the vector $ex$ is 60° less than the phase angle between the current corresponding to vector I and the voltage corresponding to the vector $e_1$. As we have assumed the latter phase angle to be 90°, the former will be 30°, and we may lay off the IR drop in resistor 7 as vector $er$ along vector II, so that the resultant $e_2$ of vectors $er$ and $ex$ leads vector II by 30°.

The voltage impressed upon the translating device 8 is proportional to the vector sum of the vectors $e_1$ and $e_2$. As the vector $e_1$ leads the vector I by 90° and is proportional to the vector I, and the vector $e_2$ leads the vector II by 30° and is proportional to the vector II, it will be seen that the vectors $e_1$ and $e_2$ will be equal and opposite only when the vectors I and II are equal and separated by a phase angle of 120°. However, under these conditions, the system of vectors I, II, III must, from Kirchoff's current law, be symmetrical. It will therefore be seen that the voltage applied to the translating device 8 disappears under the identical conditions that the negative phase-sequence components, mentioned in connection with Fig. 2, disappear. From this, it may be seen that the voltage applied to the translating device 8 is a measure of the negative phase-sequence components. By an extended mathematical proof, which is not given here, it may be shown that the sum of the vectors $e_1$ and $e_2$ is exactly proportional to the negative phase-sequence components.

If the connections of the current transformers 4 and 5 to the windings 6a and to the winding 6b and resistor 7, are transposed, the sum of the vectors e1 and e2 will become zero when the principal vectors I and II are equal and are separated by a phase angle of 120°, which corresponds to a system of symmetrical principal vectors of phase sequence reversed to that of vectors I, II and III of Fig. 3. With the latter connections it may be shown that the sum of the vectors e1 and e2 is proportional to the positive phase-sequence components.

From the above, it may be seen that I have provided a network which may be used to segregate either positive or negative phase-sequence components, and in which the secondary windings of the current transformers used are electrically separate, so that a standard Y or V connection may be used, and other translating devices, such as meters, may be operated from the transformers.

Figure 4:
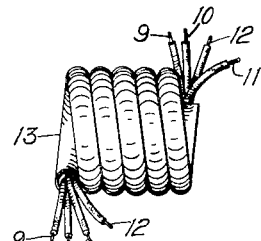
Fig. 4 is a diagrammatic elevational view of a mutual inductance device which may be used in the practice of my invention.

Referring to Fig. 4, which shows a preferred form of the mutual inductance device 6, four insulated conductors 9, 10, 11 and 12 are assembled to form a cable 13. The cable so formed is helically wound to form a coil, of such dimension and number of turns that its constants are those requisite for the particular network in which it is to be employed.

Figure 5:
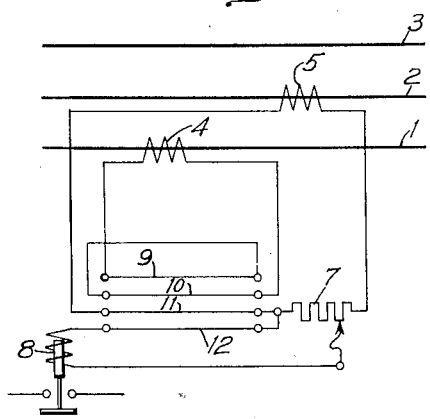
Fig. 5 is a diagrammatic view of a modification of the network shown in Fig. 1.

The connection of the cable 13 to the remaining apparatus of Fig. 1, is illustrated in Fig. 5. Two conductors 9 and 10 of the cable 13 are connected in series to form the equivalent of coil 6a of Fig. 1. Another conductor 11 is connected in circuit with the secondary of current transformer 5 and the resistor 7, in the same manner as coil 6b of Fig. 1. The remaining conductor 12 of the cable 13 is connected as the secondary winding of the mutual inductance device, in series with the translating device 8. An adjustable connection of the translating device 8 to the resistor 7 is illustrated. As two conductors 9 and 10 are connected in the secondary circuit of current transformer 4, and only one conductor 11 is connected in the secondary circuit of current transformer 5, the mutual inductance of the former circuit to the conductor 12 will be substantially double the mutual inductance of the latter circuit to the conductor 12, as in Fig. 1.

The operation of the apparatus shown in Fig. 5 is the same as that described in connection with Fig. 1.

Figure 6:
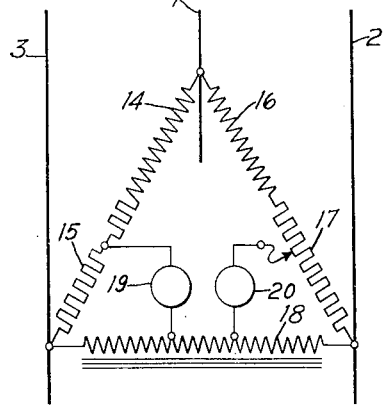
Fig. 6 is a diagrammatic view of a network for segregating positive or negative phase-sequence voltage components, embodying my invention.

Referring to Fig. 6 of the drawing, apparatus is illustrated therein for segregating the symmetrical voltage components of the voltages between three conductors 1, 2 and 3. A lagging power-factor impedance device 14 is connected in series with a resistor 15 between the conductors 1 and 3. A reactor 16 and a resistor 17, having an adjustable potentiometer tap, are connected in series to the conductors 1 and 2, in the manner shown. Any suitable device for dividing the voltage between the conductors 2 and 3 in the ratio of substantially 40%:20%:40%, such as an auto-transformer 18, having intermediate taps, is connected between the conductors 2 and 3. A voltage-responsive translating device, such as a meter 19, is connected between the junction point of impedance device 14 and resistor 15 and a tap of the auto-transformer 18. A second voltage-responsive meter 20 is connected between the potentiometer tap of resistor 17 and the remaining tap of auto-transformer 18.

The constants of the impedance device 14 and the resistor 15 are so related that the voltage across the resistor 15 is approximately 40% of the voltage between the conductors 3 and 1 and lags the latter voltage by a phase angle of 60°. Similarly, the reactance and resistance of the reactor 16 and the resistor 17 are so related and the potentiometer tap of the resistor 17 is so adjusted, that the voltage between the potentiometer tap and conductor 2 is approximately 40% of the voltage between conductors 1 and 2 and lags the latter voltage by a phase angle of 60°.

Figure 7:
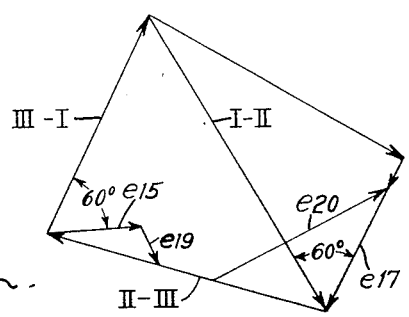
Fig. 7 is a vector diagram illustrating the voltage relationships in the apparatus shown in Fig. 6.

The operation of the apparatus shown in Fig. 6 may be set forth as follows: Assuming that an unbalanced voltage condition exists between the three conductors 1, 2 and 3, as illustrated by the vectors I—II, II—III and III—I of Fig. 7, the voltage drop in resistor 15 may be represented by a vector e15, 40% as long as vector III—I and lagging the latter by a phase angle of 60°.

The voltage drop between the potentiometer tap of resistor 17 and conductor 2 may be represented by a vector e17, 40% as long as vector I—II and lagging the latter by a phase angle of 60°.

The voltage applied to the meter 19 is represented by the vector e19 which is the resultant of vector e15 and the left 40% part of vector II—III. The voltage applied to the translating device 20 is represented by vector e20 which is the resultant of the vector e17 and the right 40% part of vector II—III.

If the voltage triangle I—II, II—III and III—I is made symmetrical, the vector e19 will become zero. This vector e19, representing the voltage applied to the meter 19, is proportional to the negative phase-sequence components of the voltage triangle. It may be shown that the vector e20, which does not disappear upon the attainment of symmetrical voltages, is proportional to the positive phase-sequence components of the voltage triangle.

In the description of Fig. 6, the figure 40% is used for illustration purposes only and any percentage below the limiting percentage of 50%, which corresponds to reactance devices having no resistance, may be used. The requirement for operativeness for the left-hand part of Fig. 6, for example, is that the voltage drop in resistor 15 lags the voltage between conductors 1 and 3 by a phase angle of 60° and bears the same ratio to this voltage as the transformation ratio of the auto-transformer 18, considering the tap connected to the meter 19 and the conductor 3 as secondary terminals. Similar considerations apply to the apparatus shown in the right-hand part of Fig. 6.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In apparatus responsive to a symmetrical component of polyphase currents, a plurality of conductors corresponding in number to the number of phases, for transmitting phase currents, current transformer apparatus including a current transformer associated with each of a plurality of said conductors and energized in accordance with the corresponding phase current, conductors completing separate circuits energized from the secondary windings of said current transformer apparatus, an impedance included in one of said circuits, mutual inductance apparatus having an inductive element included in each of said circuits and having a secondary circuit, and a translating device responsive to the voltage across said impedance and the voltage induced in said secondary circuit.

2. In apparatus responsive to a symmetrical component of three-phase currents, three conductors for transmitting phase currents, current transformer apparatus including a current transformer associated with each of a pair of said conductors and energized in accordance with the corresponding phase current, conductors completing separate circuits energized from the secondary windings of said current transformer apparatus, a resistor included in one of said circuits, mutual inductance apparatus having an inductive element including in each of said circuits and having a secondary circuit, and a translating device responsive to the voltage across said resistor and the voltage induced in said secondary circuit.

3. In apparatus responsive to a symmetrical component of three-phase currents, three conductors for transmitting phase currents, current transformer apparatus including, a current transformer associated with each of a pair of said conductors and energized in accordance with the corresponding phase current, conductors completing separate circuits energized from the secondary windings of said current transformer apparatus, a resistor included in one of said circuits, a mutual inductance device having a primary winding included in each of said secondary circuits and having a secondary winding, and a translating device responsive to the voltage induced in said secondary circuit and to the voltage across said resistor.

4. In apparatus responsive to a symmetrical component of three-phase currents, three conductors for transmitting phase currents, current transformer apparatus including a current transformer associated with each of a pair of said conductors and energized in accordance with the corresponding phase current, conductors completing a first secondary circuit energized from said current transformer apparatus, conductors completing a second secondary circuit energized from said current transformer apparatus, said first and second circuits corresponding to different phases of a three-phase current system, a mutual inductance device having a first primary winding included in said first circuit, a second primary winding included in said second circuit and a secondary winding, the mutual reactance of said first winding and said secondary winding being substantially double the mutual reactance of said second winding and said secondary winding, a resistor included in said second circuit, and a translating device responsive to the voltage across said resistor and the voltage induced in said secondary winding.

5. In apparatus responsive to a symmetrical component of three-phase currents, a mutual inductance device comprising a helically wound cable, said cable including four insulated conductors, means for energizing two of said conductors in series with alternating current, means for energizing another of said conductors with alternating current of different phase relationship to said last-mentioned current, a translating device, and means including the remaining one of said conductors for energizing said translating device.

6. In apparatus responsive to a symmetrical component of three-phase voltages, three conductors energized by three-phase voltages, impedance elements connecting two of said conductors, including a tap connection for obtaining a voltage proportional to the voltage between said two conductors and differing in phase relationship therefrom by a phase angle of 60°, means connecting one of said two conductors and the third of said conductors, including a tap connection for obtaining a voltage proportional to and in phase with the voltage between said one of said two conductors and said third of said conductors, and a translating device responsive to the voltage between said tap connections.

7. In apparatus responsive to a symmetrical component of three-phase voltages, a first conductor, a second conductor and a third conductor energized by three-phase voltages, impedance elements connecting said first and second conductors, including a tap connection for obtaining a voltage proportional to the voltage between said first and said second conductors and lagging by a phase angle of 60°, means connecting said second and third conductors, including a tap connection for obtaining a voltage proportional to and in phase with the voltage between said second and third conductors, and a translating device responsive to the voltage between said tap connections.

8. In apparatus responsive to a symmetrical component of three-phase voltages, a first conductor, a second conductor and a third conductor energized by three-phase voltages, impedance elements connecting said first and second conductors, including a tap connection for obtaining a voltage proportional to the voltage between said first and second conductors and differing therefrom in phase relationship by a phase angle of 60°, an auto-transformer connecting said second and third conductors, including a tap connection for obtaining a voltage proportional to and in phase with the voltage between said second and third conductors, and a translating device responsive to the voltage between said tap connections.

9. In apparatus responsive to a symmetrical component of three-phase voltages, a first conductor, a second conductor and a third conductor energized by three-phase voltages, impedance elements connecting said first and second conductors, including a tap connection for obtaining a voltage proportional to the voltage between said first and second conductors and lagging by a phase angle of 60°, an auto-transformer connecting said second and third conductors, including a tap connection for obtaining a voltage proportional to and in phase with the voltage between said second and third conductors, and a translating device responsive to the voltage between said tap connections.

BERNARD E. LENEHAN.